July 1, 1952  E. F. RIOPELLE  2,601,789
VIBRATION DAMPER
Filed Oct. 23, 1947
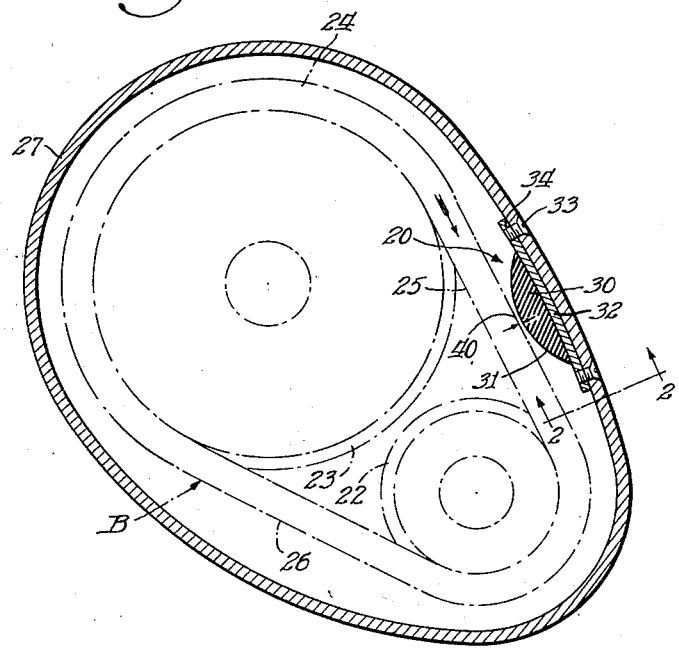
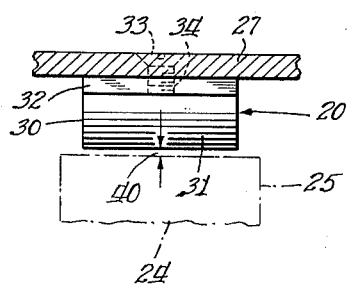
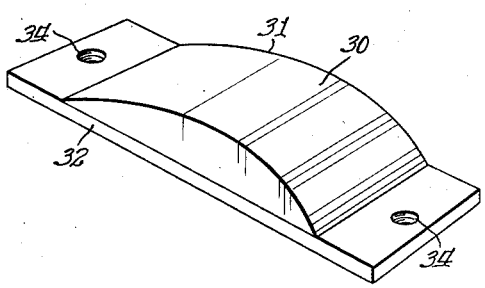
Inventor:
Earl F. Riopelle Patented July 1, 1952

2,601,789

UNITED STATES PATENT OFFICE 2,601,789

VIBRATION DAMPER

Earl F. Riopelle, Detroit, Mich., assignor to Morse Chain Company, Ithaca, N. Y., a corporation of New York Application October 23, 1947, Serial No. 781,669

5 Claims. (Cl. 74—240)

This invention relates in general to vibration dampers for flexible chains such as, for example, chains of the roller or silent chain type.

In flexible chain drive mechanisms it is important that the chain running upon a plurality of sprockets be of sufficient length so that the chain will run freely upon the sprocket wheels. A free running chain will reduce the wear upon the chain and reduce to a minimum objectionable noises usually due to the grinding of the chain upon engagement with the sprocket teeth.

It has been found that when a chain is mounted tightly upon a pair of sprockets, wear of the chain and the sprocket wheel is markedly increased and objectionable noises are present. Whenever a chain is loosely mounted upon the sprocket wheels it has been found that such chains will vibrate at certain critical speeds whenever there is an exciting force present that matches the natural frequency of the strand of chain. Under these conditions the chain will vibrate at large amplitudes causing objectionable noise and excessive wear on the chain and sprockets.

In the prior art the wear and objectionable noises have been reduced by mounting the chain upon the sprocket wheels loosely and providing a take-up means usually comprising a roller, idler wheel or shoe normally in constant engagement with the loose side of the chain. Constructions of this type usually have involved sensitive adjustments and costly operations by the inclusion of extra parts.

Accordingly, an object and accomplishment of the invention is to provide a vibration damper for a flexible chain, said vibration damper being characterized as being located on the tight side of the chain and being normally out of engagement with the strand of the chain and only becoming engaged with the strand when the chain begins to vibrate, the engagement of the chain and vibration damper being adaptable to stop all vibration of the chain.

Another object and accomplishment of the invention is to provide a vibration damper for a flexible chain drive being located out of engagement with the strand of the chain, said vibration damper permitting the chain to be mounted loosely upon the sprocket wheel thereby reducing friction, the wear of the chain and objectionable noises.

The invention seeks, as a further object and accomplishment to provide a vibration damper as contemplated herein for a flexible chain drive and characterized by an arrangement of parts to more advantageously and satisfactorily perform the function required of it and adapted to provide a compact unit which will successfully combine the factors of structural simplicity and durability, and yet be economical to manufacture.

Another object and accomplishment of the invention is to improve the construction of flexible chain drives by the incorporation therein of a vibration damper as contemplated herein, thereby to increase the efficiency and versatility of such flexible chain drives; and to this end an important feature of the invention is to provide a vibration damper for a flexible chain drive comprising in general, a body member made of a wear resistant material impervious to oil and formed to define a protuberance of general convex shape and normally removably secured to the chain drive housing, said vibration damper being particularly characterized as being located on the tight side of the chain strand and normally out of engagement of said chain strand, the vibration damper as contemplated herein and the chain strand coming into contact only when the chain begins to vibrate and the contact thereof being adaptable to dampen any such vibrations in the chain strand.

Additional objects, features and advantages of the invention disclosed herein will be apparent to persons skilled in the art after the construction and operation are understood from the within description.

It is preferred to accomplish the various objects of this invention and to practice the same in substantially the manner hereinafter fully described and as more particularly pointed out in the appended claims, reference being had to the accompanying drawing, which forms a part of this specification, wherein:

Fig. 1 is a sectional elevational view of a flexible chain drive embodying the features of this invention and illustrating the vibration damper contemplated herein in its normal operating position;

Fig. 2 is a sectional elevational view of the vibration damper contemplated herein and portions of the chain strand, this view being taken substantially on the plane of the line 2—2 in Fig. 1; and Fig. 3 is a perspective view of the vibration damper depicted in Fig. 1.

The drawing is to be understood as being more or less of a schematic character for the purpose of illustrating and disclosing a typical or preferred form of the improvements contemplated herein.

Referring to the drawing, I have illustrated the vibration damper with which the invention is particularly concerned and designated in its entirety by the numeral 20, as being operatively associated with and advantageously employed adjunctively to a conventional flexible chain drive designated in its entirety by the letter B.

The conventional chain drive may comprise a first sprocket wheel 22, a second sprocket wheel 23 which may be of larger size than said first sprocket wheel, each of said sprocket wheels being operatively associated with respective spaced shafts, an endless flexible chain 24 mounted on said sprockets and adaptable to drive the sprocket 23 through the medium of a power source (not shown) which advantageously drives the sprocket 22. In this manner, it is notable that the tight side of the chain will be located as indicated by the numeral 25 and the loose side of the chain will be located as indicated by the numeral 26. A suitable chain guard or housing for the chain drive as indicated by the numeral 27 may be provided to advantageously enclose the chain drive.

Suffice it to say, since the invention is not particularly concerned with the precise construction of the illustrated chain drive mechanism and its associated parts, they will not be further described in detail, and it is deemed sufficient for all intentions and purposes herein contained to show only portions thereof adjacent to and cooperating with the vibration damper 20 contemplated herein. It is to be understood that details of construction of such chain drive mechanism and/or its associated parts may be modified to suit particular conditions, and I do not wish to be limited to the construction of these elements as set forth, except where such construction particularly concerns the invention contemplated herein.

Having thus described, by way of example, a possible adaptation of the vibration damper as contemplated herein, and having described the general environment surrounding the adaptation, the specific construction and cooperating functions of the parts of said vibration damper 20 with which the present invention is particularly concerned, will now be described in detail.

In the exemplary embodiment of the invention depicted in Fig. 1, the vibration damper 20 with which the present invention is particularly concerned comprises in general a body member 30 made of a wear resistant material impervious to oil and formed to define a protuberance 31 of general convex shape and normally secured to a plate member 32 by any approved practice, said plate member being adaptable to be removably secured to the chain drive housing 27 by means of securing means such as, for example, bolts 33 having threaded portions adaptable to be received into suitably threaded apertures 34 in the plate member 32.

In accordance with the construction of the present invention the body member 30 preferably is made of a wear resistant material impervious to oil, such as, for example, bakelized duck, leather or rubber. It is notable that the material should be such that it is slightly resilient, which characteristic will increase its wear resistance.

Preferably, the plate member 32 is made of a suitable metal and formed of a general rectangular shape to define a surface complementary to the inside surface of the housing 27.

An important feature of the invention is that the vibration damper as contemplated herein is advantageously mounted upon the chain housing 27 in a manner so that, in the normal operation of the chain, the body member 30 of the vibration damper 20 is not in contact with the chain 26 and an open space between the body member 30 and the chain 26 is provided and said open space being defined by the arrows indicated by the numeral 40 in Figs. 1 and 2. It is notable in chain drives of the character contemplated herein that vibrations will be present at different speeds so that in the main, during the normal operation of the chain drive, no vibration is present. Accordingly, with the construction of the present invention the chain damper 20 is not in contact with the chain and, therefore, reduces the wear of the chain usually present in take-up pulleys, idler wheels and the like of the prior art construction and further, reduces a certain amount of resistance caused by constant contact of vibration dampening mediums upon the chain.

Whenever the chain speed is in a condition where an exciting force that matches the natural frequency of the strand is present, the chain will begin to vibrate like a violin string or rubber band. Under these conditions, the chain will vibrate at large amplitudes causing noise and excessive wear on the chain and sprockets. In order to eliminate such vibration occurring at critical speeds the vibration damper 20 contemplated herein is particularly characterized by its location on the tight side of the chain with a slight clearance between the chain and the body member, thus when the chain begins to vibrate upon reaching a critical speed, the chain will strike the vibration damper 20 whereupon any further vibration will be stopped. The aforementioned action is similar to placing a finger on a ringing bell.

Because of its simplicity, it is apparent that the vibration damper contemplated herein is economical to manufacture and readily adaptable to mass production manufacturing principles. Moreover, it can be easily installed in old systems to prevent chain chatter and vibration due to loosening of the chain resulting from slight wear of either the sprockets or the chain running upon such sprockets.

From the foregoing disclosure it may be observed that I have provided a vibration damper for a flexible chain drive which efficiently fulfills the objects thereof as hereinbefore set forth which provides numerous advantages which may be summarized as follows:

1. Structurally simple, efficient and durable;
2. Economical to manufacture and readily adaptable to mass production manufacturing principles; and
3. The provision of a vibration damper for a flexible chain drive, said vibration damper being characterized as being operatively disposed on the tight side of the chain and being normally out of engagement with the strand of the chain, thereby eliminating objectionable noises, friction and wear of the chain, and said vibration damper and chain only coming in contact with each other when the chain begins to vibrate, the engagement of the chain and vibration damper being adaptable to stop all vibration of the chain, the cooperative action thereof being similar to the placing of a finger on a ringing bell.

While I have illustrated a preferred embodiment of my invention, many modifications may be made without departing from the spirit of the invention, and I do not wish to be limited to the precise details of construction set forth, but wish to avail myself of all changes within the scope of the appended claims.

I claim:

1. A chain drive comprising a first sprocket wheel and a second sprocket wheel, an endless flexible chain mounted on said sprocket wheels, and a housing adaptable to enclose said chain drive, in combination with a vibration damper operatively associated with said housing, said vibration damper comprising a body member of slightly resilient and wear resistant material and disposed normally in spaced relationship with said chain.

2. A flexible chain drive comprising a pair of sprockets having a flexible chain running upon said sprockets, and a housing enclosing said chain drive, in combination with a vibration damper comprising a body member operatively related to said housing and made of a wear resistant resilient material impervious to oil and formed to define a protuberance of general convex shape, said vibration damper being located on the tight side of the chain strand and normally out of engagement with said chain strand, and said vibration damper and chain strand being adaptable to come into contact with each other only when the chain begins to vibrate upon reaching critical speeds and the contact thereof being adaptable to dampen any such vibrations present in the chain strand.

3. In a flexible chain drive comprising a pair of sprockets having an endless flexible chain running upon said sprockets, and a housing enclosing said chain drive, a vibration damper comprising a body member operatively associated with said housing and made of a resilient material formed to define a protuberance of general convex shape, said vibration damper being located on the tight side of the chain strand and normally out of engagement with said chain strand, and said vibration damper and chain strand being adaptable to come into contact with each other only if and when the chain begins to vibrate.

4. In a flexible chain drive comprising a pair of sprockets having an endless flexible chain running upon said sprockets, the combination with a fluid tight chain casing adapted to enclose said chain drive, of a vibration damper comprising a member secured to said casing and formed of a wear resistant resilient material to define a protuberance of general convex shape, said vibration damper being located on the tight side of the chain and normally out of engagement with the chain, and the high point of said convex shaped protuberance and the outer peripheral surface of the chain being adapted to come into momentary contact with each other only when the chain begins to vibrate upon reaching critical speeds and the contact thereof being adapted to dampen any such vibrations present in the chain strand, whereupon the contacting surfaces will become out of engagement to continue normal operation of the chain.

5. In a flexible chain drive comprising a pair of sprockets having an endless flexible chain running upon said sprockets and a fluid tight chain casing adapted to enclose said chain drive, a vibration damper secured to said casing and formed of a resilient material to define a protuberance projecting into the casing and located adjacent the tight side of the chain but normally out of engagement with the chain, and said protuberance and the outer peripheral surface of the chain being adapted to come into momentary contact with each other only if and when the chain begins to vibrate upon reaching critical speeds and the contact thereof being adapted to dampen any such vibrations present in the chain strand, whereupon the contacting surfaces will become out of engagement to continue normal operation of the chain.

EARL F. RIOPELLE.

REFERENCES CITED

The following references are of record in the file of this patent:

UNITED STATES PATENTS

| Number | Name | Date |
| --- | --- | --- |
| 340,629 | Silver | Apr. 27, 1886 |
| 980,141 | Breed | Dec. 27, 1910 |
| 1,280,682 | Dickinson | Oct. 8, 1918 |
| 1,777,527 | Morse | Oct. 7, 1930 |
| 1,988,421 | McCann et al. | Jan. 15, 1935 |

FOREIGN PATENTS

| Number | Country | Date |
| --- | --- | --- |
| 353,334 | Germany | July 26, 1922 |